United States Patent [19]
Berns et al.

[11] Patent Number: 5,649,460
[45] Date of Patent: Jul. 22, 1997

[54] QUICK-CHANGE SPINDLE LINER ASSEMBLY

[75] Inventors: Joseph F. Berns; William J. Bellman, both of Cincinnati, Ohio

[73] Assignee: J. F. Berns Co., Inc., Cincinnati, Ohio

[21] Appl. No.: 523,778

[22] Filed: Sep. 5, 1995

[51] Int. Cl.$^6$ .................................................... B23B 13/00
[52] U.S. Cl. ................................. 82/126; 82/124; 82/155; 279/142
[58] Field of Search .............................. 82/126, 127, 142, 82/154, 155, 163, 124; 2779/142, 156

[56] References Cited

U.S. PATENT DOCUMENTS

| | | | |
|---|---|---|---|
| 3,472,105 | 10/1969 | Ono | 279/156 X |
| 3,927,585 | 12/1975 | Austin . | |
| 4,058,036 | 11/1977 | Austin . | |
| 4,061,061 | 12/1977 | Lahm et al. | 82/127 |
| 4,149,437 | 4/1979 | Winberg et al. . | |
| 4,870,880 | 10/1989 | Cantabery | 82/163 X |
| 4,930,381 | 6/1990 | Spooner | 82/124 X |
| 5,167,175 | 12/1992 | Rohm | 82/142 |
| 5,330,224 | 7/1994 | Terwilliger et al. | 279/156 X |

FOREIGN PATENT DOCUMENTS 0776754   11/1980   U.S.S.R. ................................. 82/163

*Primary Examiner*—M. Rachuba
*Assistant Examiner*—Henry W. H. Tsai
*Attorney, Agent, or Firm*—Charles R. Wilson

[57] ABSTRACT

A spindle liner and spindle liner assembly are for use in a lathe. A quick-change feature allows the spindle liner to be readily installed and readily replaced with a new spindle liner. The spindle liner has a tubular sleeve with a set of annular bearing rings and an annular mounting flange. An adapter specially configured for mounting on a particular lathe is designed for use with the spindle liner. The adapter has an annular body with a center hole to allow the tubular sleeve of the spindle liner to be slid through it. A recessed shoulder around the hole has a diameter to accommodate the annular mounting flange of the spindle liner. The adapter also has at least one and preferably opposed retainer lugs extending inwardly from a peripheral edge of the annular body and overlying the recessed shoulder. An equal number of notches in the mounting flange of the spindle liner are positioned to align with the retainer lugs when the spindle liner is positioned in the lathe. A partial rotation of the spindle liner allows its mounting flange to abut up against the recessed shoulder. A spring-loaded pin in a retainer lug of the adapter and a keeper hole in the mounting flange of the spindle liner become engaged and hold the spindle liner in place during use. A simple set of manipulations is all that is needed to remove the spindle liner in a very quick and efficient manner.

16 Claims, 4 Drawing Sheets

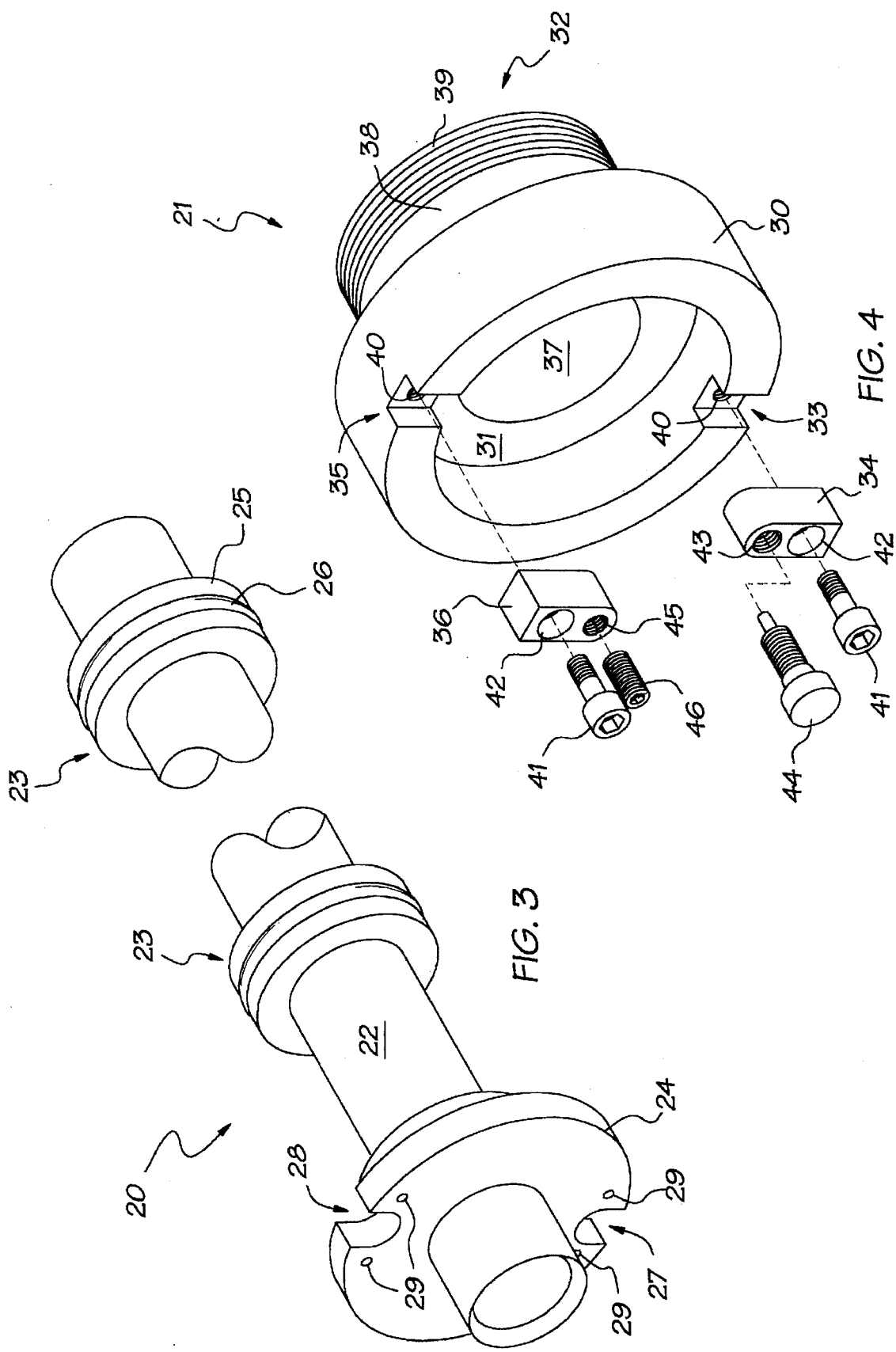

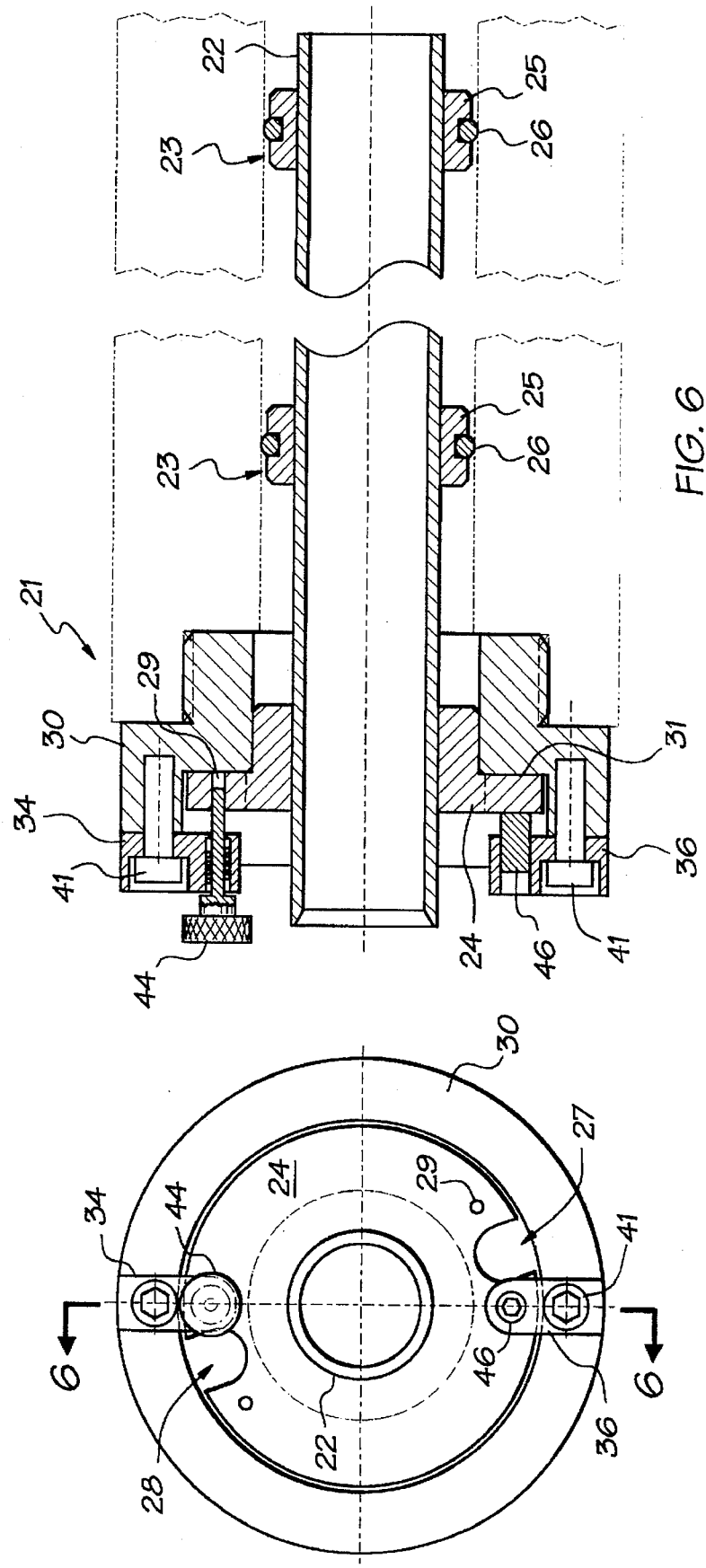

QUICK-CHANGE SPINDLE LINER ASSEMBLY

This invention relates to a spindle liner assembly for use in a lathe. More particularly, the invention relates to a spindle liner and a spindle liner assembly having a quick-change feature.

BACKGROUND OF INVENTION

Lathes of various sorts are used to mechanically shape workpieces for industrial and commercial purposes. All lathes have a stationary headstock which includes a driven spindle and a revolving chuck. Certain lathes utilize a hollow spindle. A workpiece such as an elongated bar is passed into and through the hollow spindle until it reaches the jaws of the chuck. One end of the workpiece can extend just beyond the chuck where a cutting tool is able to engage the workpiece as the workpiece rotates to provide a desired cut or shape. The workpiece can extend more fully through the chuck and, in some lathes, is supported at a second end by a movable tailstock. In either case, an end portion of the workpiece remains within the hollow spindle.

A spindle liner is conventionally used with elongated workpieces which have an end portion which remains within the spindle while another end is being machined. The spindle revolves at several hundred revolutions per minute. It is necessary that the workpiece be concentrically aligned within the spindle and rigidly supported to alleviate workpiece shattering. The spindle liner serves this purpose. It is a tubular member which has an inside diameter to slideably receive the workpiece with a minimum of dead space. A set of annular bearing rings are secured to an outside surface of the tubular member. The bearing rings have an outside diameter which allows the spindle liner to fit into the hollow spindle of the lathe and bear against its walls. Necessarily, there will be a number of different sized spindle liners for each lathe. Basically, a spindle liner with a properly sized inside diameter tubular member is needed for each of the different sized workpieces that are to be machined.

In use, a particular spindle liner is selected from a set of spindle liners depending on the workpiece to be machined. The spindle liner is properly inserted into the lathe and secured to it. A mounting flange near one end of the spindle liner and a set of bolts are often used to bolt the spindle liner to the lathe. When a different sized workpiece is to be machined, it is necessary to unbolt and remove the first spindle liner. The next spindle liner is then positioned and bolted to the lathe. This is a time consuming task. If several different sized workpieces are being processed daily, then the need to constantly change spindle liners becomes a serious productivity negative.

There have been attempts to solve the well recognized problem of spindle liner change-over experienced by many shops. U.S. Pat. Nos. 3,927,585, 4,058,036 and 4,149,437 all contain disclosures of spindle liners which have adjustable clamping means within a tubular member. The clamping means are able to accommodate several different diameters of workpieces. Accordingly, a single spindle liner is permanently mounted in the hollow spindle of the lathe. Thereafter, the clamping means within the spindle liner is adjusted according to need to handle virtually any cross-dimension size of workpiece. Unfortunately, the disclosed adjustable spindle liners are rather complex in design. This necessarily makes the spindle liners costly. It also creates problems in use.

There has been developed a spindle liner and spindle liner assembly which addresses the main drawback associated with the widely used conventional spindle liners. That being the excessive time involved with having to change spindle liners every time a different sized workpiece is to be machined. In accord with a long felt and well recognized need, there has now been developed a spindle liner with a quick-change feature. Spindle liners having the feature are readily installed and replaced. Down time normally associated with changing of spindle liners is significantly reduced. The improved spindle liners and spindle liner assemblies of the invention have the quick-change feature benefit without associated drawbacks of complexity of design, significant increase in cost or added skill in lathe operation.

SUMMARY OF THE INVENTION

A spindle liner and spindle liner assembly have a quick-change feature which allows the spindle liner to be readily installed and removed from a lathe. The spindle liner has a tubular sleeve dimensioned to fit into a hollow spindle of the lathe. A set of annular bearing rings are secured to an outside surface of the sleeve. A mounting flange with at least one edge notch is secured near one end of the tubular sleeve. The mounting flange is configured to mate with an adapter. The adapter is permanently mounted on the lathe at a workpiece feed end of the hollow spindle. It has a central hole sufficiently wide to receive the tubular sleeve and annular bearing rings of the spindle liner. A cavity formed by a recessed shoulder around the hole is dimensioned to receive the mounting flange of the spindle liner. The adapter also has at least one retainer lug which extends inwardly from near a periphery of the annular body and overlies the recessed shoulder. The retainer lug has a spring-loaded pin. An optional second retainer lug has a set screw to aid in properly orienting a non-circular workpiece within the hollow spindle. The notches of the spindle liner's mounting flange and the retainer lugs of the adapter work in concert to readily receive the flange of the spindle liner when it is fully inserted into the hollow spindle and, with a partial rotation of the spindle liner, to securely hold it. Retraction of the spring-loaded pin and a reverse rotation of the spindle liner frees it for a quick removal.

BRIEF DESCRIPTION OF THE DRAWINGS

FIG. 3 is a perspective view of the spindle liner used in the spindle liner assembly of FIG. 1.

FIG. 4 is a perspective view in exploded form of the adapter used in the spindle liner assembly of FIG. 1.

FIG. 5 is an end view of the spindle liner assembly of FIG. 1.

FIG. 6 is a sectional side view of the lathe with the spindle liner assembly shown in FIG. 1.

DETAILED DESCRIPTION OF THE INVENTION

The spindle liner and spindle liner assembly of the invention are discussed and illustrated in conjunction with a single lathe. It should be understood that lathes of various designs produced by different manufacturers are able to utilize the spindle liner and spindle liner assembly of the invention. Routine modification of an adapter forming a part of the spindle liner assembly is needed based on the intended lathe as will become apparent from the following description.

Figure 1:
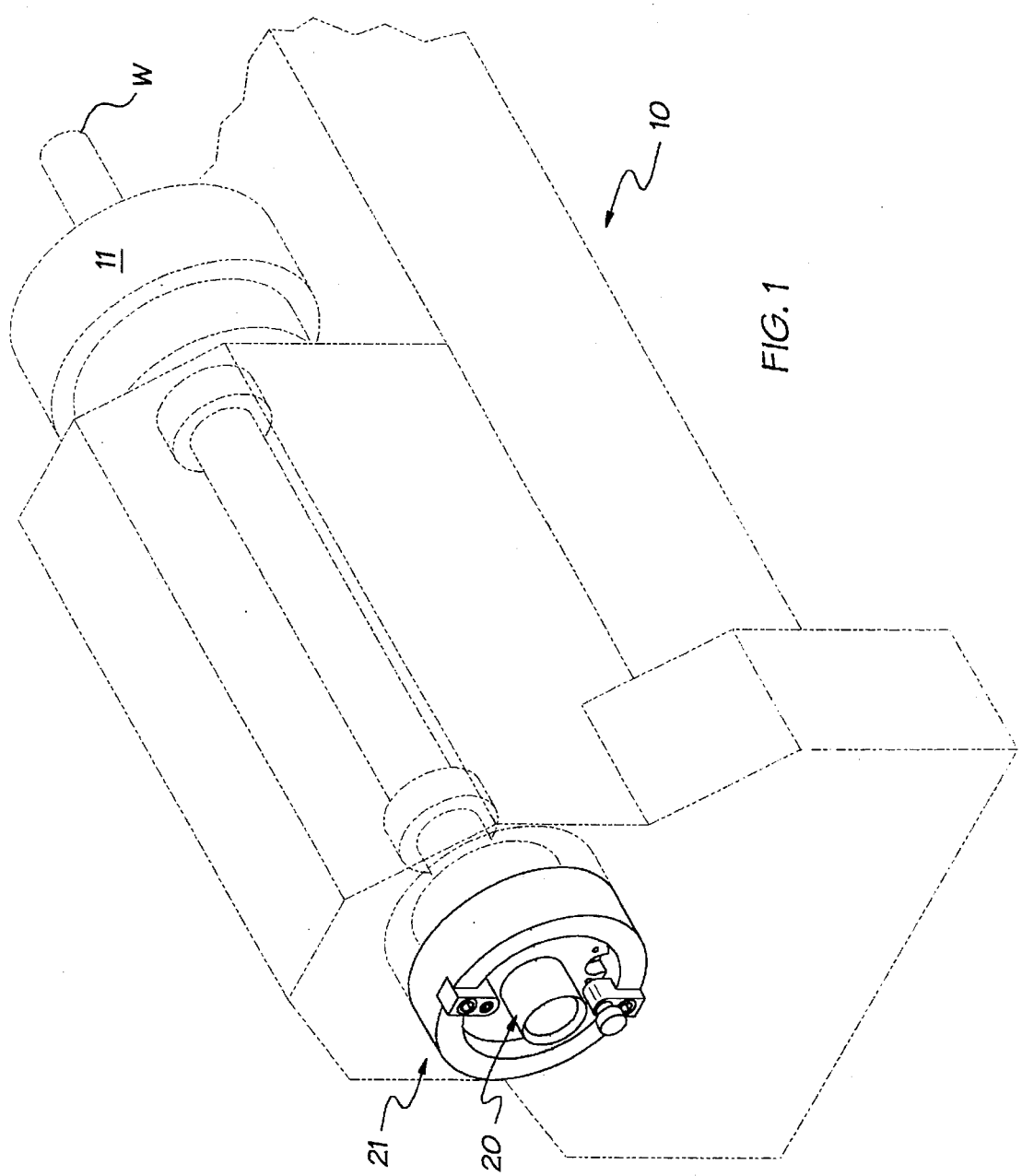
FIG. 1 is an environmental view in perspective of a lathe with a spindle liner assembly of the invention in position.

With reference to FIG. 1, there is shown a lathe 10 in schematic form. It comprises a headstock 11 which includes a three-jawed chuck and a spindle. The spindle defines a hollow area. A cutting tool (not shown) is mounted on a track for movement into operable association with a workpiece W. As evident, the workpiece W is held by the chuck so that a portion to be machined extends past the jaws of the chuck and is in a position to be machined by the cutting tool. A spindle liner 20 of the invention is shown positioned in the hollow spindle of the lathe 10. An adapter 21 used in the invention and forming a part of a spindle liner assembly is shown mounted on the lathe 10 at the hollow spindle's feed end. The spindle liner 20 and adapter 21 and their interaction are described in detail in the following paragraphs.

Figure 2:
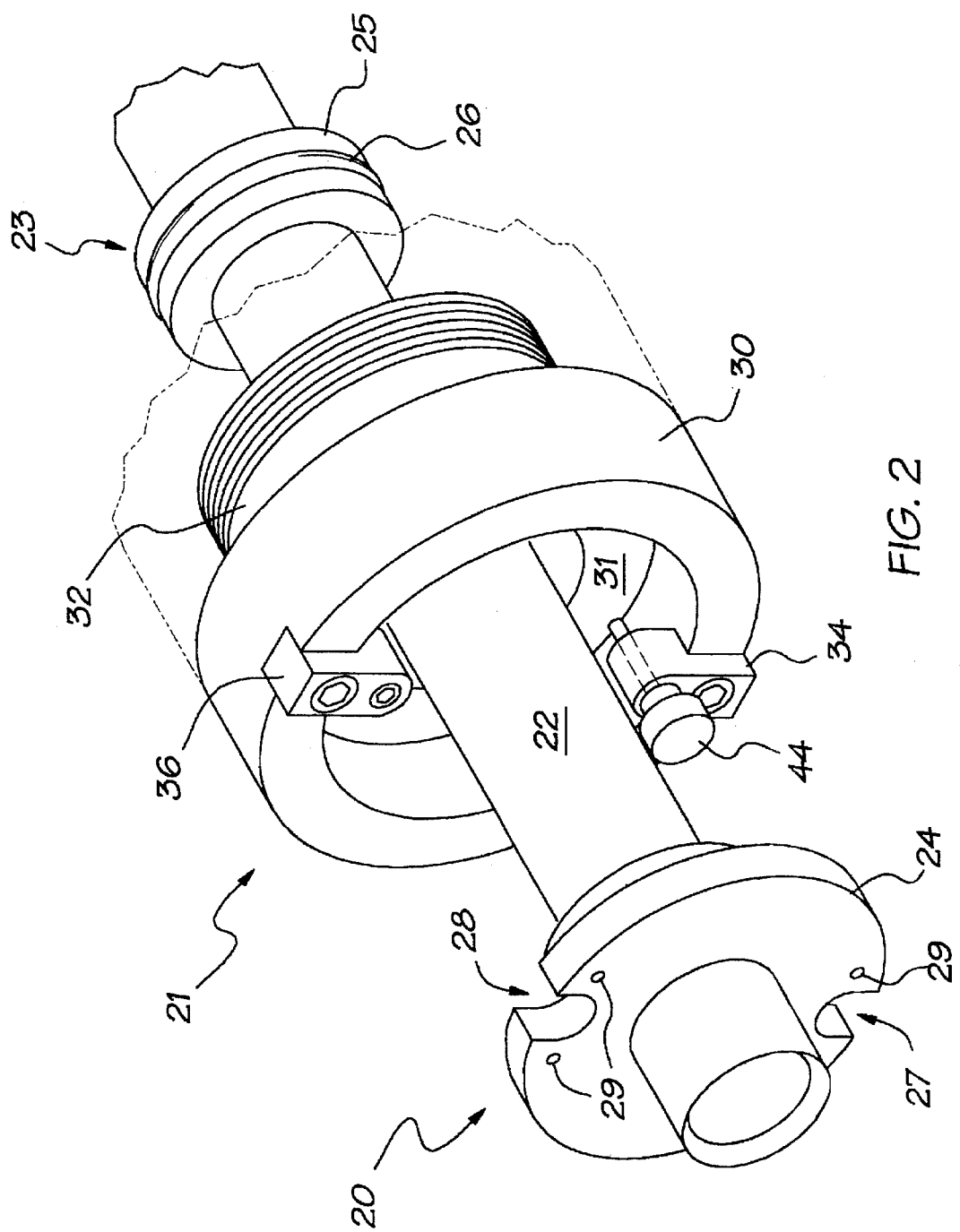
FIG. 2 is a perspective view of the spindle liner assembly of FIG. 1 isolated and in the process of being assembled.

The spindle liner 20 as best seen in FIGS. 2 and 3 has a tubular sleeve 22, bearing rings 23 and an annular mounting flange 24. The tubular sleeve has a length dependent on the lathe in which it is to be used. About two feet to about five feet in length is typical. Its inside diameter is dependent on the workpiece it is to accommodate. As known in the industry, a set of spindle liners of varying sleeve diameters is generally needed. Each sleeve's inside diameter is ideally slightly larger than the diameter or maximum cross-dimension of the workpiece so as to slidably receive the workpiece with a minimum of play. Stock workpiece diameters vary widely. A diameter of from about one-fourth inches to about six inches is commonly used, though smaller and larger diameter workpieces are available. As further described below, the spindle liners of the invention can also accommodate workpieces having square, rectangular, hexagonal or other shaped cross-cuts. The tubular sleeve of the spindle liner is dimensioned to accommodate virtually any sized workpiece which the lathe is built to handle.

The bearing rings 23 are conventional in nature. They comprise an annular member 25 permanently secured to the outside surface of the tubular sleeve 22 and a resilient O-ring 26 in a groove extending around the annular member. Their purpose is to bear against the inside wall of the hollow spindle to stabilize the spindle liner and its associated workpiece during operation of the lathe. Accordingly, the outside diameter of the bearing rings is dimensioned to allow the spindle liner to slide into the hollow spindle of the lathe with a minimum of play. Each lathe is dimensioned differently. Accordingly, each bearing ring on a spindle liner is specially dimensioned for that lathe. The bearing rings are substantially uniformly spaced along the tubular sleeve in accord with requirements well known to those in the industry.

In accord with this invention, the mounting flange of the spindle liner is configured for use with the adapter to achieve a quick-change feature. The adapter, as discussed in detail below, is permanently mounted on the lathe. The mounting flange of the spindle liner mates with the adapter in a manner which results in ready spindle liner installation and changeover. Accordingly, various dimensions of the mounting flange of the spindle liner and the adapter are coordinated to achieve a secure attachment.

The mounting flange 24 best depicted in FIGS. 2 and 3 is permanently secured to the tubular sleeve 22. The flange is circular-shaped with its outside diameter coordinated with dimensions of the adapter. At least a first notch 27 is provided in a peripheral edge of the circular flange. It extends partially into the flange in a radial direction, generally about one-half inches to about one inch. As shown, a second notch 28 is found on the mounting flange 24 opposite the first notch 27 for reasons which follow. A keeper hole 29 is provided on one side, preferably both sides, of each of the notches 27 and 28. The keeper hole is to receive a tip of the a spring-loaded pin on the adapter to temporarily hold the spindle liner to the adapter in the lathe.

As best seen in FIGS. 2 and 4, there is shown the adapter 21 forming a part of the spindle liner assembly of the invention. The adapter 21 has an annular body 30 with a cavity formed by a recessed shoulder 31 and an attachment means 32. The annular body 30 further has a first radial slot 33 to receive a first retainer lug 34. Optionally, though highly preferred, the annular body 30 also has a second radial slot 35 to receive another retainer lug 36. A center hole 37 extends through the annular body 30. The diameter of the hole 37 is sufficient to allow the bearing rings 23 of the spindle liner 20 to pass through it when positioning the spindle liner in the lathe. The recessed shoulder 31 is circular and surrounds the hole 37. It has a diameter sufficiently large to receive the mounting flange 24 of the spindle liner 20. The depth of the cavity formed by the recessed shoulder is sufficient to fully receive the spindle liner's mounting flange 24.

Attachment means 32 on the adapter 21 is an annular flange 38 which extends from a back side of the annular body 30. It has external threads 39. The particular attachment means configuration is dependent on the particular lathe to be used. Some lathes are built to receive an externally threaded annular flange as depicted in FIG. 4. Other lathes, for example, require an internally threaded annular flange or a flat face flange with bolts.

The adapter 21 has the radial slots 33 and 35 to receive the retainer lugs 34 and 36. Each slot extends from a periphery of the annular body to the cavity formed by the recessed shoulder 31. A threaded hole 40 is provided in a base of each slot to receive a bolt 41 of the associated retainer lug. The first retainer lug 34 is plug-shaped to fit into the first slot 33 and extends partially into the cavity of the adapter. It has a bore hole 42 to receive the bolt 41. The bore hole 42 of the retainer lug is aligned with the threaded hole 40 in the base of the slot so that the bolt 41 can be used to hold the retainer lug to the annular body 30. The retainer lug also has a second hole 43 which is internally threaded. A spring-loaded pin 44 is threaded into the hole 43 for engaging the keeper hole 29 in the mounting flange 24 of the spindle liner 20. Pins of this nature are commercially available. Other retention means, e.g. pins, screws or the like for the same purpose are feasible.

The second retainer lug 36 is optional, though highly preferred for holding in place a non-circular shaped workpiece. The lug 36 is shaped similarly to the first retainer lug 34 and as well has a bore hole 42 to receive a bolt 41. The second retainer lug also has an internally threaded bore hole 45 to receive a set screw 46. The non-circular shaped workpiece must be oriented to a certain position so as to be properly held by the lathe's chuck. Accordingly, the workpiece is positioned in the tubular sleeve of the spindle liner and then the spindle liner rotated until the workpiece is properly oriented. The set screw 46 on the retainer lug 36 is now tightened to retain the spindle liner and the associated workpiece properly oriented. The first retainer lug 34 is not used in this case.

The interaction of the spindle liner 20 and the adapter 21 of the spindle liner assembly of the invention is best understood with reference to FIGS. 1, 2, 5 and 6. Initially, the adapter 21 is permanently mounted on the lathe 10 at the hollow spindle terminus. It remains there while a particular spindle liner is positioned in the lathe, removed and replaced by another spindle liner having a tubular sleeve of a different inside diameter. With particular reference to FIG. 2, the spindle liner 20 is partially slid through the hole of the adapter 21 into the hollow spindle. As the mounting flange 24 of the spindle liner approaches the adapter 21, the liner and its associated mounting flange are rotated until the notches 27 and 28 of the flange are aligned with the retainer lugs 34 and 36 of the adapter. The spindle liner 20 is pushed further into the hollow spindle until the mounting flange notches pass beyond the retainer lugs and the mounting flange is flush with the recessed shoulder of the adapter. With reference to FIGS. 1, 5 and 6, the spindle liner is still further rotated until the spring-loaded pin 44 of the retainer lug 34 engages one of the keeper holes 29 in the mounting flange. The spindle liner 20 can be rotated clockwise or counter-clockwise since keeper holes are located on each side of notches in the mounting flange. Once the spring-loaded pin engages a notch, the spindle liner is sufficiently secured to the adapter to prevent further movement during operation of the lathe.

In operation, the adapter used in the spindle liner assembly is permanently secured to the lathe. It remains in place in that it is able to receive any one of several spindle liners having tubular sleeves of different inside diameters. A particular spindle liner is selected based on the workpiece to be machined. The spindle liner is slid through the center hole of the adapter until its mounting flange approaches the annular body of the adapter. The mounting flange of the spindle liner is rotated until its notches are aligned with the retainer lugs of the adapter. The spindle liner is further slid into the hollow spindle until the spindle liner flange abuts up against the recessed shoulder of the adapter. The spindle liner is rotated a sufficient distance until the spring-loaded pin on one of the adapter's retainer lugs engages a keeper hole of the flange. The spindle liner is now in place and ready to receive a workpiece. The workpiece is concentrically held within the tubular sleeve in a substantially vibration-free manner. Upon completion of the desired machining of the workpiece, the spring-loaded pin is retracted and the spindle liner is reverse rotated until its notches are again aligned with the retainer lugs of the adapter. The liner can now be simply slid out of the hollow spindle and just as readily replaced with another spindle liner.

While the spindle liner and spindle liner assembly of the invention have been described in detail and with particular reference to the drawings, it should be understood various modifications can be made. All modifications of an obvious nature are considered within the scope of the appended claims.

We claim:

1. A spindle liner for use in a lathe having a spindle liner adapter mounted thereon to concentrically hold an elongated workpiece partially contained within the spindle liner in a substantially vibration-free manner during a machining operation, said spindle liner comprising:
    (a) a tubular sleeve having a length to fit into a hollow spindle of the lathe and having a diameter to hold the workpiece;
    (b) at least one annular bearing ring secured on an outside surface of the tubular sleeve to produce a bearing relationship with a wall of the hollow spindle; and
    (c) an annular mounting flange near one terminus of the tubular sleeve and secured thereto, said annular mounting flange for engaging the spindle liner adapter on the lathe to hold the spindle liner in the hollow spindle of the lathe during use, further wherein the annular mounting flange has at least one notch extending radially from a peripheral edge thereof partially into the flange.

2. The spindle liner of claim 1 wherein the mounting flange has two notches extending from the peripheral edge thereof.

3. The spindle liner of claim 2 where the notches on the mounting flange are opposed one another.

4. The spindle liner of claim 3 wherein the mounting flange is circular-shaped and the notches extend radially inwardly.

5. The spindle liner of claim 1 wherein the mounting flange has at least one keeper hole in a face thereof which is capable of receiving a pin tip during use.

6. The spindle liner of claim 5 further having a first keeper hole on a face of the mounting flange to one side of the notch and a second keeper hole on a face of the mounting flange to an opposite side of the notch.

7. The spindle liner of claim 3 wherein each of the opposed notches on the mounting flange has a first keeper hole on a face thereof to one side of the notch and a second keeper hole on a face thereof to an opposite side of the notch.

8. The spindle liner of claim 1 having two annular bearing rings, said bearing rings spaced apart a sufficient distance to stabilize the spindle liner within the hollow spindle of the lathe during use.

9. A quick-change spindle liner assembly for use in a lathe wherein a spindle liner having an inside diameter to accommodate a certain sized workpiece is capable of being replaced with another spindle liner to accommodate another sized workpiece, said assembly comprising:
    (a) an adapter to fit onto the lathe to receive a spindle liner and hold it in a manner which allows said spindle liner to be installed and removed in an efficient manner, said adapter having (i) an annular body with a center hole through which a portion of the spindle liner can pass and a recessed shoulder in a face of the annular body around the center hole to form a cavity so as to receive an annular mounting flange of the spindle liner, further wherein the annular body has at least one slot extending from a peripheral edge, and (ii) a retainer lug which fits into each said slot and extends inwardly to overlie the cavity, further said retainer lug having a retention means to engage the annular mounting flange of the spindle liner; and
    (b) a spindle liner having (i) a tubular sleeve with a length to fit into a lathe and a diameter to hold a workpiece in a substantially concentric vibration-free manner, (ii) at least one annular bearing ring secured on an outside surface of the tubular sleeve to accommodate the lathe's hollow spindle, and (iii) an annular mounting flange near one terminus of the tubular sleeve and secured thereto so as to mate with the recessed shoulder of the adapter to hold the spindle liner in the lathe during use, further wherein the annular mounting flange has at least one notch extending radially from a peripheral edge thereof partially into the flange to accommodate each retainer lug on the adapter.

10. The quick-change spindle liner assembly of claim 9 wherein the retention means of the retainer lug of the adapter is a spring-loaded pin operably associated therewith and the mounting flange of the spindle liner has a keeper hole in a face thereof such that said spring-loaded pin engages said keeper hole during use.

11. The quick-change spindle liner assembly of claim 10 further wherein the spindle liner has a first keeper hole on a face of the mounting flange to one side of the notch and a second keeper hole on a face of the mounting flange to an opposite side of the notch.

12. The quick-change spindle liner assembly of claim 9 wherein the mounting flange of the spindle liner has two notches therein which extend inwardly from a peripheral edge and further wherein the annular body of the adapter has two aligned slots therewith.

13. The quick-change spindle liner assembly of claim 12 wherein the notches on the mounting flange of the spindle liner are opposed one another.

14. The quick-change spindle liner assembly of claim 13 wherein each of the opposed notches on the mounting flange of the spindle liner has a first keeper hole on a face thereof to one side of the notch and a second keeper hole on a face thereof to an opposite side of the notch.

15. The quick-change spindle liner assembly of claim 12 further wherein a second retainer lug has means to aid in orienting a non-circular cross-dimension workpiece to properly hold it in position during operation of the lathe.

16. A spindle liner assembly for use in a lathe whereby a spindle liner for a workpiece is capable of being readily installed in the lathe and readily replaced with another spindle liner to accommodate another sized workpiece, said assembly comprising:

(a) an adapter to fit onto the lathe to receive a spindle liner and securely hold it, said adapter having (i) an annular body with a center hole through which a portion of the spindle liner can pass and a recessed shoulder in a face of the annular body around the center hole to form a cavity so as to receive an annular mounting flange of the spindle liner, further wherein the annular body has two opposed slots extending from a peripheral edge, (ii) a first retainer lug which fits into one of said slots to extend inwardly to overlie the cavity and a spring-loaded pin operably associated with said first retainer lug, and (iii) a second retainer lug which fits into the other said slot to extend inwardly to overlie the cavity and a set screw operably associated with said second retainer lug; and (b) a spindle liner having (i) a tubular sleeve with a length to fit into the lathe and a diameter to hold the workpiece in a substantially concentric vibration-free manner, (ii) at least one annular bearing ring secured on an outside surface of the tubular sleeve to accommodate the lathe's hollow spindle, and (iii) an annular mounting flange near one terminus of the tubular sleeve and secured thereto as to mate with the recessed shoulder of the adapter to hold the spindle liner in the lathe during use, further wherein the annular mounting flange has opposed notches extending from a peripheral edge thereof partially into the flange to accommodate the first and second retainer lugs on the adapter and has keeper holes in a face thereof on each side of the notches to receive the spring-loaded pin of the first retainer lug of the adapter.

* * * * *